United States Patent

McCabe

[15] 3,664,957
[45] May 23, 1972

[54] DEHYDROCONDENSED POLY(ORGANO) SILICONES

[72] Inventor: Leo J. McCabe, Glassboro, N.J.
[73] Assignee: Mobil Oil Corporation
[22] Filed: Nov. 20, 1969
[21] Appl. No.: 878,575

[52] U.S. Cl. .................................. 252/49.6, 260/46.5 R
[51] Int. Cl. ............................................ C10m 1/50
[58] Field of Search ............ 252/49.6; 260/29.1 SI, 46.5 G, 260/448.2 E

[56] References Cited

UNITED STATES PATENTS

| | | | |
|---|---|---|---|
| 2,777,868 | 1/1957 | Mixer et al. | 260/448.2 |
| 2,819,236 | 1/1958 | Dickmann | 260/29.1 SI |
| 2,950,250 | 8/1960 | Fainman | 260/49.6 |
| 2,909,548 | 10/1959 | Bailey et al. | 252/49.6 X |
| 2,958,707 | 11/1960 | Warrick | 252/49.6 X |
| 3,234,175 | 2/1966 | Pike | 260/29.1 SI X |
| 3,296,063 | 1/1967 | Chandler | 260/29.1 SI X |
| 3,308,079 | 3/1967 | Heanni | 260/29.1 SI X |
| 2,834,754 | 5/1958 | Hatch et al. | 260/46.5 G |
| 3,231,542 | 1/1966 | Eisinger et al. | 260/448.2 E X |

Primary Examiner—Daniel E. Wyman
Assistant Examiner—W. Cannon
Attorney—Oswald G. Hayes, Andrew L. Gaboriault, Raymond W. Barclay and Claude E. Setliff

[57] ABSTRACT

Dehydrocondensed poly(organo) silicones are produced by heating a poly(organo) silicone in the presence of an organic peroxide. The products per se, or in combination with other organic fluids, both mineral and synthetic, provide lubricating compositions evidencing good high temperature stability and antiwear properties.

6 Claims, No Drawings

DEHYDROCONDENSED POLY(ORGANO) SILICONES

DESCRIPTION OF THE INVENTION

1. Field of the Invention

This invention relates to novel dehydrocondensed poly(organo) silicones and in particular to such silicones obtained by heating a poly(organo) silicone with an organic peroxide.

2. Description of the Prior Art

U.S. Pat. Nos. 3,205,173 and 3,206,405 are concerned with peroxide-treated esters. U.S. Pat. No. 3,128,246 teaches treating of mineral oils with peroxide. U.S. Pat. No. 3,069,280 shows the polymerization of a fluoroethylene in poly(dimethyl) siloxane using an organic peroxide.

SUMMARY OF THE INVENTION

In accordance with the present invention, there are provided novel dehydrocondensed poly(organo) silicones produced by the method comprising heating a poly(organo) silicone in the presence of an organic peroxide.

The dehydrocondensed poly(organo) silicone is itself suitable as a high temperature lubricant, or it may be blended with a mineral oil, an ester oil lubricant, a synthetic hydrocarbon fluid lubricant, or with the starting poly(organo) silicone to provide fluids having excellent high temperature characteristics.

DESCRIPTION OF SPECIFIC EMBODIMENTS

The products of this invention are reaction products obtained by heating poly(organo) silicones in the presence of an organic peroxide at a temperature at least at which the proxy radicals form thermally at a desired and convenient rate.

The starting poly(organo) silicones used in preparing the product of this invention are generally described in U.S. application Ser. No. 308,335, filed Sept. 23, 1963 now U.S. Pat. No. 3,450,736. For the purpose of describing the preparation of the starting materials in detail, said application is incorporated herein by reference.

Briefly, polysilicones containing hydrogen atoms bonded directly to the silicon atom of the polymer chain are used. These polysilicones may be characterized as containing the recurring structure

wherein R is hydrogen, a hydrocarbyl group, such as alkyl, cycloalkyl, aryl, alkaryl, or aralkyl containing from one to about 30 carbon atoms, or as in the case of a cross-linked polymer, a silicone side-chain similar to the main polymer chain. When R is a hydrocarbyl group, the R/H ratio of the polymer is desirably from about 1 to about 2.

The polysilicones may possess a cyclic or linear structure, the cyclic structure comprising cyclic chains containing the above recurring unit. The linear structure may be represented by the formula:

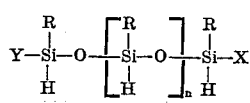

wherein R has the a aforementioned meaning, X and Y, which may be the same or different, represent hydrogen atoms, hydrocarbyl groups as aforementioned or alkoxy having from one to 30 carbon atoms and n indicates the number of recurring units.

In general, the polysilicone used has a molecular weight of at least 500.

A particularly useful polysilicone is the poly(methyl hydrogen) silicone containing the repeating unit

and possessing a molecular weight of from at least 500 to about 10,000, preferably from about 1,000 to about 5,000.

The above-described polysilicones are reacted with an unsaturated compound having at least one unsaturated double bond in the presence of a catalyst substantially in accordance with the reaction:

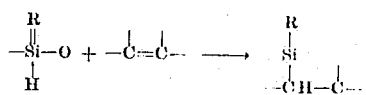

to give the starting poly(organo) silicones.

It will be noted that R of the polysilicone can be hydrogen. When R is a hydrocarbyl, the reaction will be as shown, with no reaction between the unsaturated compound and R. However, where R is hydrogen, an addition reaction may also take place between this additional hydrogen and further amounts of the unsaturated compound so that the two substituents attached to each of the silicon atoms of the polymer chain are supplied by the unsaturated compound.

Thus, the poly(organo) silicones used as starting materials for the compounds of this invention may be characterized as containing the recurring structure

wherein $R_1$ is the same as $R_2$, or is a different hydrocarbyl group (i.e., alkyl, cycloalkyl, aryl, alkaryl and aralkyl) containing from one to about 30 carbon atoms, and $R_2$ is a radical derived from unsaturated compounds containing at least one unsaturated double bond. These include hydrocarbons, that is mono-olefins, either straight or branched chain, e.g., hexene-1, decene-1, etc., cycloolefins such as cyclohexene, cycloheptene, polyolefins, such as butadiene or polymeric materials containing ethylenic unsaturation such as polybutenes, and aromatic olefins exemplified by styrene. In addition, there are included unsaturated organic compounds containing oxygen atoms and nitrogen atoms, including esters, wherein either the acid or alcohol moiety contains an unsaturated double bond. Examples of this latter class are dioctyl maleate, dioctyl fumarate, methyl-10-undecenoate, and glyceryl monooleate. Also, unsaturated acids or anhydrides such as tetrapropenylsuccinic anhydride, and amine salts such as dibutyl amine methacrylate are included. In general, the above unsaturates contain from about four to about 30 carbon atoms. The products obtained cannot be set forth precisely, since the reaction taking place is a complex one. However, the final product after peroxide treatment, contains the same recurring units.

The peroxides which may be used in this invention include hydrocarbyl hydroperoxides, dihydrocarbyl peroxides, acyl hydroperoxides and diacyl peroxides. Such peroxides include dibutyl peroxide, diamyl peroxide, di-tertiary-butyl peroxide, di-tertiary-amyl peroxide, 2,5-dimethyl-2,5-di(t-butylperoxy) hexane and

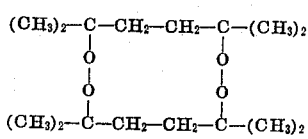

butyl hydroperoxide, amyl hydroperoxide, hexyl hydroperoxide, benzol hydroperoxide, dibenzoyl peroxide, acetyl peroxide and the like. Generally, alkyl, aryl and acyl peroxides having from one to 20 alkyl carbon atoms or one to 10 carbon atoms in substituent groups of aromatic peroxides may be used. Most preferred are the tertiary-alkyl peroxides, especially di-tertiary-butyl peroxide.

The procedure for making the dehydrocondensed poly(organo) silicone of this invention simply involves charging a poly(organo) silicone to a suitable reactor and slowly mixing therewith a peroxide, preferably a minor proportion first, with stirring. A nitrogen sweep may be employed if desired. The contents of the reactor are heated from about 20° C. to about 200° C., preferably from about 20° C. to about 150° C. until the remainder of the peroxide has been added. About 5 percent to about 50 percent, preferably from about 5 percent about 10 percent by weight of the total reactants of the peroxide may be added. After the peroxide has been added, the reaction is completed by stirring and heating from about 20° C. to about 200° C., preferably about 20° C. to about 150° C. for from 2 hours to 8 hours. Suitable means for removal of undersired reaction products may be made a part of the reactor for convenience. Excess peroxide and decomposition products may be removed in vacuuo at elevated temperatures.

The following Examples are presented to illustrate the invention without limiting its scope.

EXAMPLE 1

Eight hundred parts of poly(methyl hexyl) silicone having a molecular weight of about 960 was charged to a suitable reactor. The flask and contents were stirred and purged with nitrogen for about 5 minutes. 20 ml of di-tertiary-butyl peroxide peroxide (DTBP) was added and the reactor contents were heated to 145° C. More DTBP was added at this temperature in 15 ml aliquots every 15 minutes until a total of 60 parts thereof was added. After the peroxide addition was completed, the reactor contents were stirred at 145°–150° C. for 4 hours. During the reaction period, a liquid-liquid extractor containing water was attached to the reactor to collect tertiary-butyl alcohol acetone and other peroxide decomposition products. Upon completion of the reaction, the product was stripped to 175° C. at 1.8 mm. of Hg to remove excess peroxide and decomposition products. The final product was a very viscous, pale amber liquid. The properties of this product are as follows:

KV at 100° F.   1045 cs
KV at 210° F.   251.8 cs
Acid No.        0.03 mg KOH/gm
Flash Point     525° F.
Pour Point      <−35° F.

The same properties of the starting poly(methyl hexyl) silicone are as follows:

KV at 100° F.   57.8 cs
KV at 210° F.   16.5 cs
Acid No.        0.1 mg KOH/gm
Flash Point     525° F.
Pour Point      <−65° F.

EVALUATION OF PRODUCTS

As has already been stated, the dehydrocondensed product itself has excellent oxidative stability and antiwear properties. Also, when used as an additive with other organic fluids, it provides combinations having better oxidative stability and antiwear properties than the organic fluid alone. In the following tests, the dehydrocondensed product of Example 1 (designated as A) was tested with various conventional additives, in combination with the starting poly(methyl hexyl) silicone (designated as B), or with the starting materials and conventional additives.

Oxidative Test

In this test, the sample is subjected to oxidation by passing an air stream through the sample at 425° F. for 24 hours at the rate of 5 liters per hour. Samples of copper, lead, aluminum and iron metals are present in the fluid. The lead specimen is a sheet one-fourth inch × one-fourth inch × one-sixteenth inch and is preweighed to determine weight loss. Results of the test include percent change in kinematic viscosity at 100° F., visual sludge formation, and lead loss. These results are as follows:

TABLE I

| Blend | NN | %KV Increase | Pb Loss Mg | Sludge |
|---|---|---|---|---|
| 100% B | 1.5 | Too Viscous | 9 | gels |
| 98% B+1% PAN+1% Van Lube 81 | 1.5 | 55 | 14 | moderate |
| 98% A+1% PAN+1% Van Lube 81 | 0.4 | 40.6 | 0.1 | nil |
| 10% A+88% B+1% PAN+1% Van Lube 81 | 0.4 | 10.5 | 0.1 | light |
| 50% A+48% B+1% PAN+1% Van Lube 81 | 0.4 | 1.0 | 0.3 | nil |

PAN = N-phenyl-alpha-naphthylamine
Van Lube 81 = dioctyl diphenyl amine, i.e., 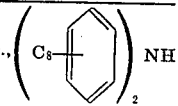

Antiwear Test

The test used was the well-known 4-Ball Test. The test was run using steel-on-steel balls rotating at 600 rpm. The following results, at the temperatures, times and loads indicated, were obtained.

TABLE II

| Sample | Load Kg. | Test Temp., °F. | Test Time, Min. | Wear Scar Diam. Min. | Observation |
|---|---|---|---|---|---|
| B | 60 | 75 | 30 | 0.5 | Scar area showed signs of tearing. |
| A | 60 | 75 | 30 | 0.3 | Scar area smooth and even. |
| B | 60 | 390 | 1.5 | 0.6 | Test terminated because of load squeeling and torque pulled out fully. |
| A | 60 | 390 | 30 | 1.01 | Scar area showed signs of tearing. |

TABLE III

| Sample | Load, Kg. | Test Temp., °F. | Test Time, Min. | Wear Scar Diam., MM |
|---|---|---|---|---|
| B | 40 | 167 | 60 | 0.910 |
| A | 40 | 167 | 60 | 0.535 |
| 10% A+90% B | 40 | 167 | 60 | 0.713 |
| B | 10 | 400 | 30 | 0.853 |
| A | 10 | 400 | 30 | 0.250 |
| 10% A+90% B | 10 | 400 | 30 | 0.290 |

In addition to the silicone fluids of the above tests, other organic fluids, both mineral and synthetic, may be improved by the use of the condensed poly(organo) silicone of this invention. These include oils of lubricating viscosity, both petroleum base oils and synthetic oils. However, it is to be understood that the use of such oils is not to be limited to lubricating metal-to-metal surfaces. It is intended that "oils of lubricating viscosity" shall be understood in its broader sense, encompassing such uses therefor as hydraulic fluids, transmission oils, heat transfer fluids and the like.

More particularly, the mineral oil employable with the compounds of this invention include the refined mineral oils (both naphthenic and paraffinic) of lubricating viscosity, as well as oils from hydrocracking procedures, as from the high boiling fractions or still residues which are cracked in the presence of hydrogen.

As examples of synthetic oils, the carboxylic acid esters may be mentioned. These include, but are not limited to, the 2,2-disubstituted 1,3-propanediol esters, trimethylolalkane esters, and pentaerythritol esters of monocarboxylic acids having up to about 20 carbon atoms, or mixtures of esters. Also esters of neopentyl glycol, 2,2-diethyl-1,3-propanediol and the like may be improved. Other esters which may be used include the mono- and dicarboxylic acid esters in which the organic groups contain up to about 20 carbon atoms. These may include octyl acetate, butyl stearate, dibutylphthalate, and the like.

When the dehydrocondensed poly(organo) silicones of the inventions are used in combination with any of the aforementioned mineral or synthetic lubricants, they may be used in concentrations of from about 5 percent of the total weight of the composition to about 90 percent thereof, preferably from about 10 percent to about 50 percent.

While the present invention has been described in considerable detail in connection with a few specific embodiments for specific purposes, it is apparent tat novel compositions of this invention are not restricted to such embodiments and details for there are many obvious modifications and variations which enhance their wide application in various types of utilization. Accordingly, the present invention should not be construed as limited in any particulars except as may be recited in the appended claims or required by the prior art.

I claim:

1. A lubricating oil composition comprising a mixture of (1) a major proportion of an oil of lubricating viscosity selected from the group consisting of a mineral oil, a synthetic ester oil and a poly(organo) silicone and (2) a lubricating oil improving amount of a dehydrocondensed poly(organo) silicone produced by heating at a temperature at which peroxy radicals are thermally formed (a) a poly(organo) silicone having the recurring unit

wherein $R_2$ is a radical selected from the group consisting of mono-olefins, cyclo-olefins, polyolefins, phenyl-substituted olefins, olefinic carboxylic acids and amine salts and esters of said acids, and mixtures thereof, and $R_1$ is a member of the group consisting of $R_2$, alkyl, cycloalkyl, aryl, alkaryl and aralkyl, each having from one to about 40 carbon atoms, with (b) an organic peroxide.

2. The composition of claim 1 wherein the said oil is a synthetic oil having lubricating viscosity.

3. The composition of claim 2 wherein said synthetic oil is an ester.

4. The composition of claim 2 wherein the said synthetic oil is a poly(organo) silicone.

5. The composition of claim 4 wherein the said poly(organo) silicone is poly(methyl hexyl) silicone.

6. The composition of claim 1 wherein the said product is dehydrocondensed poly(methyl hexyl) silicone.

* * * * *